INVENTOR.
GEORGE S. BOTT

United States Patent Office 3,437,471
Patented Apr. 8, 1969

3,437,471
COMPACT AMPULE SEALER
George S. Bott, Westwood, N.J., assignor to American Cyanamid Company, Stamford, Conn., a corporation of Maine
Filed Mar. 30, 1966, Ser. No. 538,839
Int. Cl. C03b 29/00, 23/18
U.S. Cl. 65—270                                                  5 Claims

ABSTRACT OF THE DISCLOSURE

An ampule sealer which rotates about an axis comprising a spring clamp which engages the heat softened ampule neck and pulls the neck out to separate and seal the ampule neck.

Background of the invention

Numerous machines have been designed for sealing ampules. This is usually effected by melting with a flame the extending neck of an ampule and finally drawing it out and breaking it off. Most of the sealers provide for ampule holders which are turned as a table or other support moves them through the machine so that when the neck comes opposite the flame of the sealing burner, the neck is turned to provide uniform heating of the glass and also, in the case of ampules in which a portion of neck is to be broken off, to twist the glass as it is being sealed. In the case of necks which are to be twisted off after sealing, there have also been designed numerous mechanisms for pulling the neck to a fine capillary as the glass is melted, which capillary is finally broken off. Elaborate means for discharging the portions of the necks which have been severed were also provided. All of the machines have been elaborate, heavy, and do not lend themselves readily to smaller sealing lots and cannot readily be moved from one place to another. With one exception, the burners have to substantially surround the neck or the movement has to be stopped at the melting and sealing off station. The exception above noted involves an elaborate mechanism by which the burner or burners continuously move around with the ampules, drawing their gas supply from grooves in a block or plate. This is not only elaborate and expensive, but also the problem of preventing gas leakage is an extremely formidable one, which is one reason why this type of machine has not replaced the more common type where the burners are stationary which have to surround the neck of the ampule or be multiple burners directing flames spaced around the neck periphery.

Summary of the invention

The present invention is an improved ampule sealer which, while retaining the general features of rotating ampule holders, pulling out of the neck of the ampules and also all of the advantages of the exceptional type of machine in which the burners move around with the ampules throughout the whole circuit of a machine cycle, at the same time completely avoiding problems of gas supply and leakage. At the same time the mechanism is extremely simple, using a smaller number of parts than has normally been necessary before. In other words, the present invention shares all of the advantages of the known sealers, including even the exceptional sealer with rotating burners, without any of the disadvantages and, in certain preferred structures with an improved design of elements, even though these elements may have been present in known machines or similar elements which performed their functions.

Essentially, the present invention provides for a slowly rotating table, preferably circular, carrying ampule holders which rotate in bearings in the table and also provides for burner travel with the ampules for the necessary portion of a complete cycle to effect the seal. Except for the burner travel over a small arc of the complete circle, the functions performed by the elements of the present invention are essentially the same or similar to those of known machines. In the modification of the present invention, which provides for melting off excess length of necks of ampules, there is also provided an improved design of neck holder in the form of split fingers which also move the burner through a sealing zone and are actuated by a cam to raise the fingers gradually as the sealing zone is traversed, and finally to permit the burner which follows the ampule during the sealing portion of the cycle to return to its original position to seal the next succeeding ampule.

There is also involved in a preferred modification an improved neck holding mechanism and excess neck discharging mechanism which is covered as a more specific aspect of the present invention although not a requirement for the broader operation. At the same time, the present invention permits continuous operation rather than intermittent operation with indexing, which greatly simplifies drive and reduces the number of parts needed.

Description of the preferred embodiments

Figure 1:
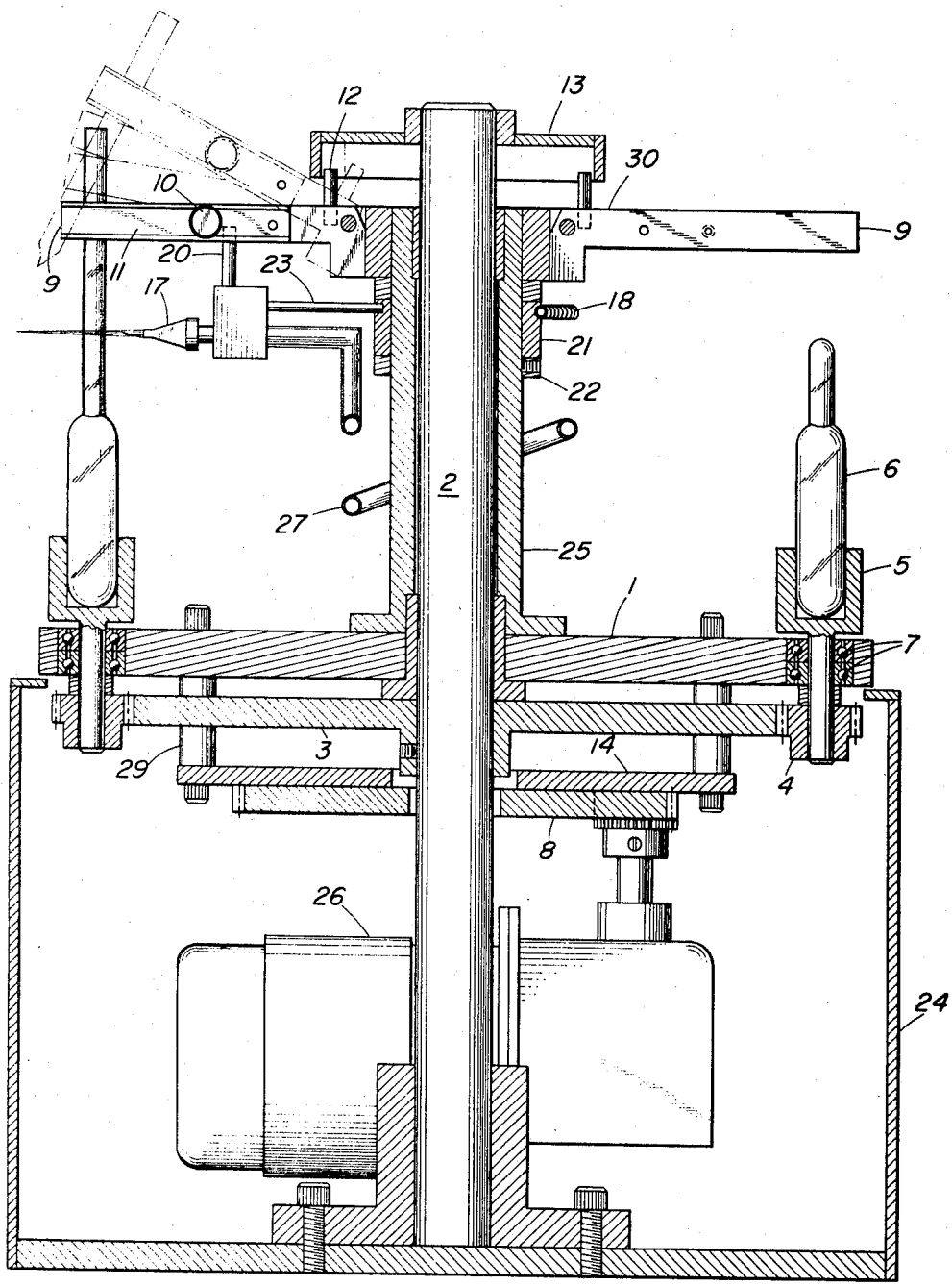
FIG. 1 is a vertical section through the machine.

The machine is mounted in a housing 24 which houses drive motors, electrical controls (which are not shown as they are of conventional types), and is a base for the ampule holding table 1 which is rotated. As can be seen in FIG. 1, there is a stationary central shaft 2, having a cap 13 fastened to its top, the cap being in the form of a cam-shaped drum, as will be described below. On the central shaft there is keyed a stationary gear 3, while the turntable carrying ampule holders is journaled to turn about the central shaft.

Figure 2:
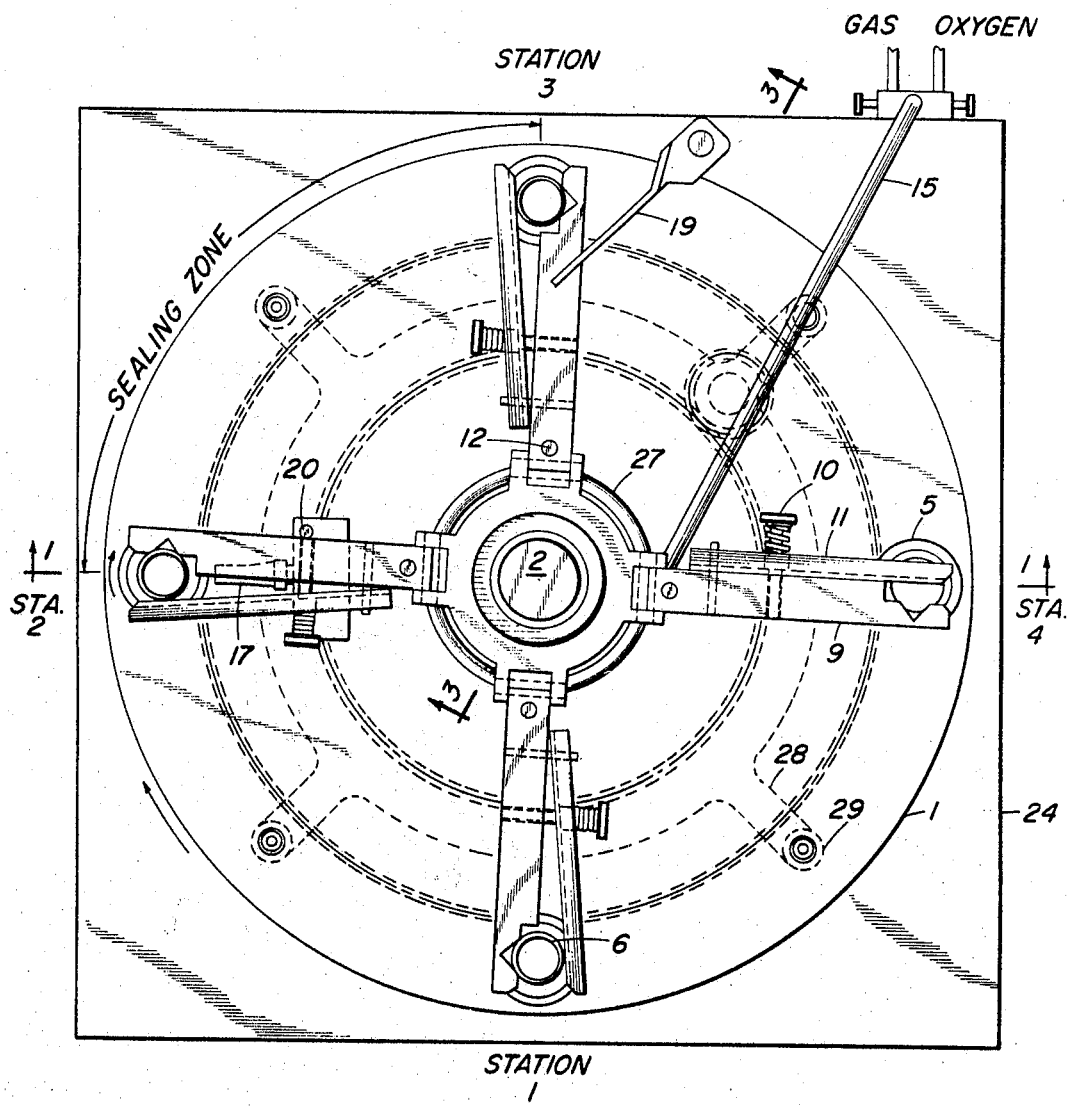
FIG. 2 is a plan view with the neck holding finger actuating cam removed for clarity.

The turntable 1 carries a plurality of ampule holders 5, four in the illustrative drawing, as can be seen from FIG. 2, each ampule holder having a shaft journaled in bearings 7 and carrying at its end small gears 4 which mesh with the large stationary gear 3. Rotation of the turntable 1 is effected by the motor 26 through conventional reduction gears driving a turntable gear 8 which, through an intermediate plate 14, drives the table through projections 28 (FIG. 2), and spools 29.

Fastened to the turntable 1 is an intermediate column 25 which is rotatable about the central shaft 2. This column carries at its top four neck clamps 9 which are pivoted and which are of two pieces, the main part 30 having held thereto through spring screws 10 a second part 11 which at the end forms with the main finger 30 a fork capable of grasping the neck of an ampule 6. The fork end grips the neck in a manner reminiscent of some types of clothes pins. At the back of the pivoted clamp 9 there are projections 12 which contact the inner face of the drum cam 13.

On the intermediate support column there is a burner support pivot collar 21 with a retaining collar 22 which receives a burner supporting arm 23 which rigidly supports the burner 17. The collar 21 carrying the supporting arm can turn about the sleeve 25 against the pull of a spring 18. The burner 17 is also provided with an upwardly projecting pin 20 which can engage each of the clamps 9 in their lowered position, and effects drive for the burner 17 through a portion of the rotation of the turntable 1, as will be described in more detail below.

In operation the ampules 6 are fed into the ampule holders 5 and grasped by spring fork at the end of the clamps 9 at a loading point marked Station 1 on FIG. 2. Feed of the ampules may be manual or can be effected automatically by automatic feed mechanisms which are of conventional design and which are therefore not shown, as their particular design forms no part of the present invention. It will be obvious that as the ampules are fed into their holders the necks are grasped by the spring fork formed of the main part 30 of the clamp 9 and the spring held part 11. The clamps 9 thereafter hold the neck of the ampule under the pressure of the spring screw 10 until reaching Station 3 where the neck is removed, as will be described below in connection with FIG. 3.

As the turntable rotates in the direction of the arrow shown in FIG. 2, it presently reaches Station 2, shown in FIG. 2, and the upwardly projecting pin 20 of the burner head 17 strikes the lowered clamp 9 and is carried along with it. FIG. 1 shows the clamp 9 in various positions as the turntable rotates. Full lines show the position where it first strikes the pin 20 at the Station 2, whereas further positions in which the clamp 9 has been raised by contact with the inner surface of the drum cam 13 are shown in dashed lines.

As the turntable turns through the quadrant from Station 2 to Station 3 in FIG. 2, which is labelled "sealing zone," the rotating neck of the ampule is uniformly heated by the flame from the burner 17 which moves along with it. The burner is capable of moving through about 90° as its gas supply, which comes from a pipe 15 to a coiled flexible section 27, permits a quarter turn without breaking connection to the burner 17. There is therefore supplied the necessary fuel gases and oxygen to the burner without any possibility of leakage and without the necessity of complicated precise-fitting, sliding gas supplies. As the neck of the ampule melts, or rather softens, the pivoted clamp 9 begins to rise about half way through the sealing zone, which pulls up the neck, forming a thinner and thinner capillary. It should be noted that as the glass melts there is sufficient holding power in the forked ends of the clamps 9 to keep the upper portion of the neck of the ampule from turning or to cause it to turn more slowly than the ampule itself is rotated. This effects a twisting action, which facilitates drawing out the capillary and finally, toward the end of the sealing zone, breaking it off. This twisting effect is not new with the present invention, but it is an advantage that the present invention, with its simplified constructional design, retains the function of twisting.

Figure 3:
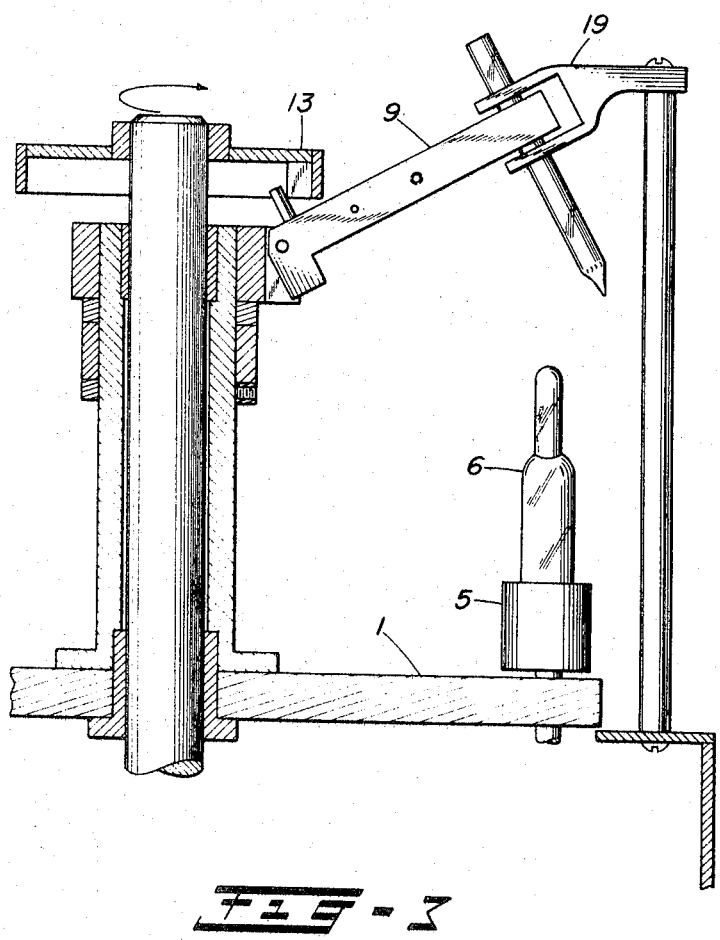
FIG. 3 is a section along the line 3—3 on FIG. 2.

FIG. 3 shows a detail of the neck discarding mechanism which occurs as the clamp 9 carrying the twisted off neck reaches Station 3 on FIG. 2. As is shown in FIG. 3, the clamp 9 is finally lifted to a point where two results occur. First, the neck is pulled off at the capillary and second, the clamp is lifted out of engagement with the driving pin of the burner 17. The burner, therefore, swings back through a little less than 90° under the pull of the spring 18 and is in a position to encounter the next ampule as described above. As Station 3 is reached, the clamp 9 carrying the neck passes through the fork at the end of the finger 19, as is shown in FIG. 3, and this fork, which is stationary, pulls the ampule neck and with it the part 11 of the clamp 9 against the pressure of the spring 10. As this opens the clamp 9, the neck, which has been pulled off, drops out of the clamp into a waste neck receptacle (not shown).

The turntable keeps on rotating to Station 4, at which point it is unloaded, either manually or by known automatic unloading means. As the turntable continues, the now empty ampule holder moves to the loading Station 1 and the operations described above are repeated with a new ampule. It will be apparent that four ampules are sealed for each rotation of the turntable 1. The number of ampules which can be sealed in a single operation depends of course upon the number of clamps 9, which however should not be too numerous as it is necessary to permit softening of the glass through a fairly long sealing zone. Four clamps have been found to be a very satisfactory compromise between adequate sealing time and production, but of course the invention is in no sense limited to any particular number of clamps and ampule holders. However, with four holders a sealing rate of 20 to 25 seals per minute is readily effected. The number of seals of course is determined by the rate at which the turntable turns, but with four clamps 20 to 25 seals a minute can easily be effected with manual operation by a single operator who alternately unloads an ampule at Station 4 and then loads a fresh one to be sealed at Station 1. Of course with automatic loading and unloading still higher speeds are possible within the limit of adequate sealing time, as has been pointed out above.

The operation of the machine is very reliable; the number of parts is small and they are rugged, and in large scale operation it has been found that each seal is perfect except for the rare cases where there is a defect in the glass in the ampule.

Ampules with long necks a portion of which is broken off after sealing, constitutes the most common form and is the one which has been described above. However, it is sometimes necessary to seal vessels with short necks in which the neck is merely melted without breaking off a piece. It is an advantage of the present invention that this type of sealing can be effected with equal ease on the present machine. In such a case, however, the spring clamps 9 perform only the function of driving the burner through its sealing zone travel and do not also perform the additional function of pulling out an ampule neck and finally twisting it off. This adds a practically desirable versatility to the machine, which is achieved without any change in mechanism.

It will be apparent that the machine is practically self-contained and the main housing 24 can be portable. For example, it can be mounted on wheels and moved from one laboratory to another, plugging in power wherever the sealing operation is required. Of course in moving it it is also necessary to disconnect the gas supply and, equally obvious, the new location must have such a supply. The portability is an important practical advantage which is achieved by the simpler mechanism of the present invention because it often occurs that ampules need to be sealed at different locations in smaller batches. With a stationary machine design there is not this additional flexibility, and so this constitutes an additional practical advantage of the present invention which is achievable without any further complication.

It is of course obvious that different sized ampule holders can be used, and this also adds to the versatility and flexibility of the machine. It is also a simple matter to adjust the machine for sealing of ampules of different glass thicknesses by a simple control of the speed of the drive motor, allowing a slower turning and hence a longer time in the sealing zone for ampules of thicker glass. In commercial machines several speeds are normally provided for the turntable, but as the speed control is by conventional electrical controls these have not been illustrated as their particular design forms no part of the present invention.

It is usually desirable to have a round turntable but this is by no means essential, since the same function can be performed with any shape of table provided the ampule holders are mounted at the same distance from the central shaft. However, as a round turntable is convenient and readily fabricated, such a shape is usually preferred.

I claim:

1. In an ampule sealing machine provided with a movable turntable and rotatable ampule holders thereon and means for moving the turntable and rotating the holders, the improvement which comprises, (a) a plurality of forked clamps adapted to engage ampule necks and rotating with the turntable in alignment with the ampule holders, (b) means for raising the clamps gradually through a predetermined arc in the turntable rotation, the means raising the clamps from a substantially horizontal position to a position of maximum elevation, (c) a sealing burner mounted to move through said predetermined arc of the turntable movement, said burner being positioned to extend horizontally and play a flame on the neck of an ampule, said burner being also provided with upwardly projecting means for engaging a clamp in its lowered position, the means projecting sufficiently above the burner so that they remain engaged with the clamp until the clamp has nearly reached its position of maximum raising so that when an ampule with its clamp reaches the burner, the burner is moved by the clamp through said predetermined arc of the turntable rotation, thereby being kept in alignment with the sealing point on the ampule, said means being disengaged by elevation of the clamp nearly to its maximum raised position, (d) means for returning the burner to its original position on disengagement.

2. An ampule sealing device according to claim 1 in which means are provided to supply the burner with combustible gaseous constituents through flexible tubing disposed to permit movement of the burner through the predetermined arc of the turntable movement through which it is driven by a clamp.

3. An ampule sealing device according to claim 2 comprising a central non-moving shaft on which the turntable is journaled for rotation, cam means on said shaft and cam following means on the clamps for raising gradually each clamp during the predetermined arc of the turntable rotation through which the burner is being driven, said cam and cam follower raising the clamp at the end of said burner movement to a position out of engagement with the burner driving means, and gear means mounted on the central shaft engaging gears for individual ampule holders, dimensioned to cause the ampule holders to rotate at a rate greater than that of turntable rotation.

4. An ampule sealing device according to claim 3 in which the clamps are composed of two portions held together by spring pressure and means are provided after turntable rotation through the predetermined arc through which the burner is driven by the clamp to move the two portions of the clamp apart whereby if they are grasping an ampule neck piece which has been lifted off at the end of the sealing operation, said neck piece is dropped.

5. A device according to claim 2 in which the means for returning the burner to its original position comprises a spring against the tension of which the burner is moved through the predetermined arc of turntable rotation.

References Cited
UNITED STATES PATENTS 3,265,487   8/1966   Kahlenberg _____ 65—272 X DONALL H. SYLVESTER, Primary Examiner.

A. D. KELLOGG, Assistant Examiner.

U.S. Cl. X.R.

65—227, 272, 283